United States Patent [19]

Wentz et al.

[11] 3,817,368
[45] June 18, 1974

[54] AUTOMATIC LOADING SYSTEM

[75] Inventors: Edward A. Wentz, Gaithersburg; John H. Swam, Manchester, both of Md.

[73] Assignee: American Chain & Cable Company Inc., Bridgeport, Conn.

[22] Filed: Sept. 8, 1972

[21] Appl. No.: 287,518

[52] U.S. Cl. ................................. 198/21, 198/34
[51] Int. Cl. ........................................... B65g 47/42
[58] Field of Search............. 198/34, 21, 40, 31 AC

[56] References Cited
UNITED STATES PATENTS

| | | | |
|---|---|---|---|
| 3,187,878 | 6/1965 | Harrison et al. | 198/40 |
| 3,242,342 | 3/1966 | Gabar | 198/40 |
| 3,515,254 | 6/1970 | Gary | 198/21 |

Primary Examiner—Evon C. Blunk
Assistant Examiner—Hadd Lane
Attorney, Agent, or Firm—Zalkind, Horne & Shuster

[57] ABSTRACT

Packages delivered at random are automatically positioned on a loading conveyor by signal controlled interruption in its movement to discharge the packages onto a continuously moving sorting conveyor at a fixed center to center relationship regardless of package length. Photo-sensing devices detect the presence of packages approaching and at spaced locations along the loading conveyor to limit the spacing between packages and synchronize transfer of the packages to trays on the sorting conveyor regardless of package length by delays in synchronizing signals from the sorting conveyor causing said interruption in loading conveyor movement.

8 Claims, 9 Drawing Figures

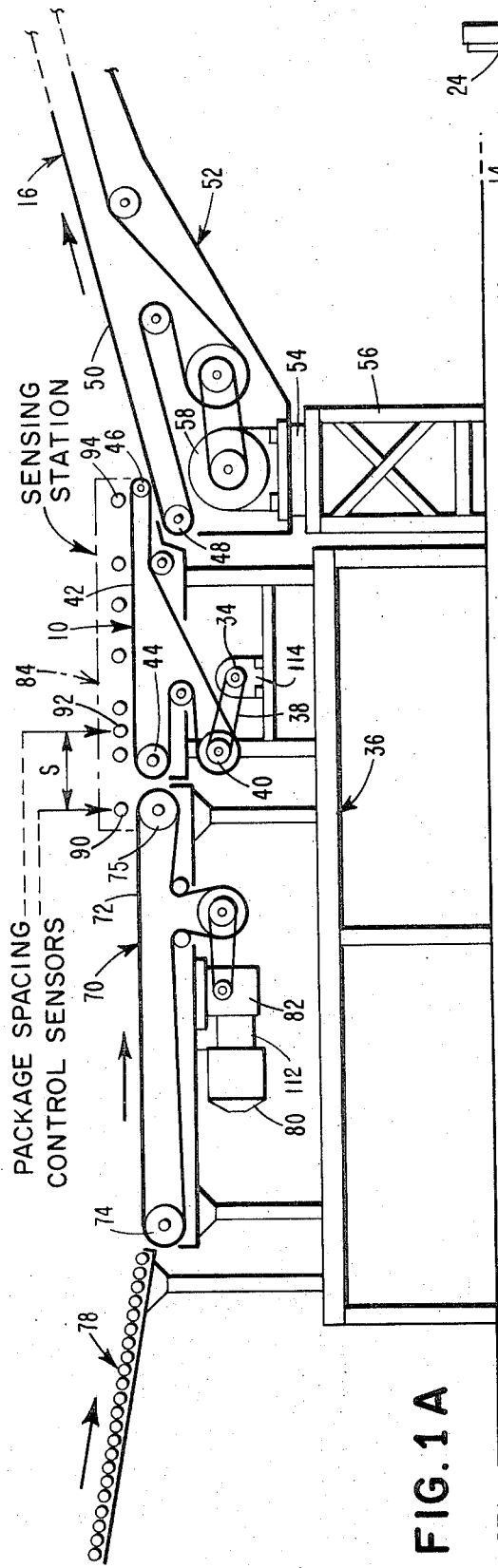
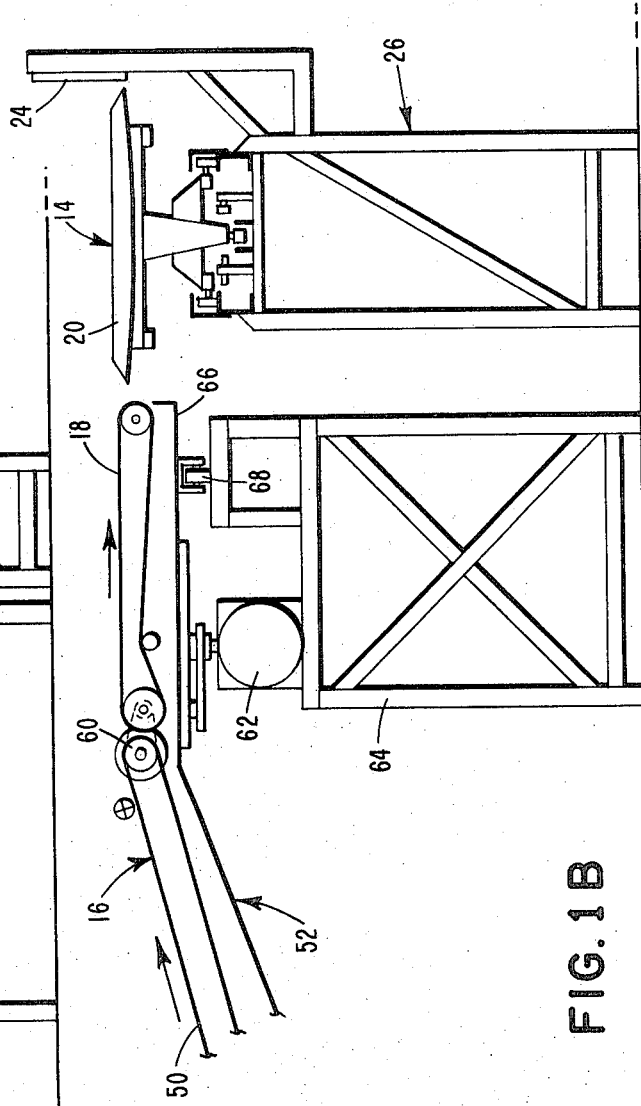
FIG. 1A
FIG. 1B

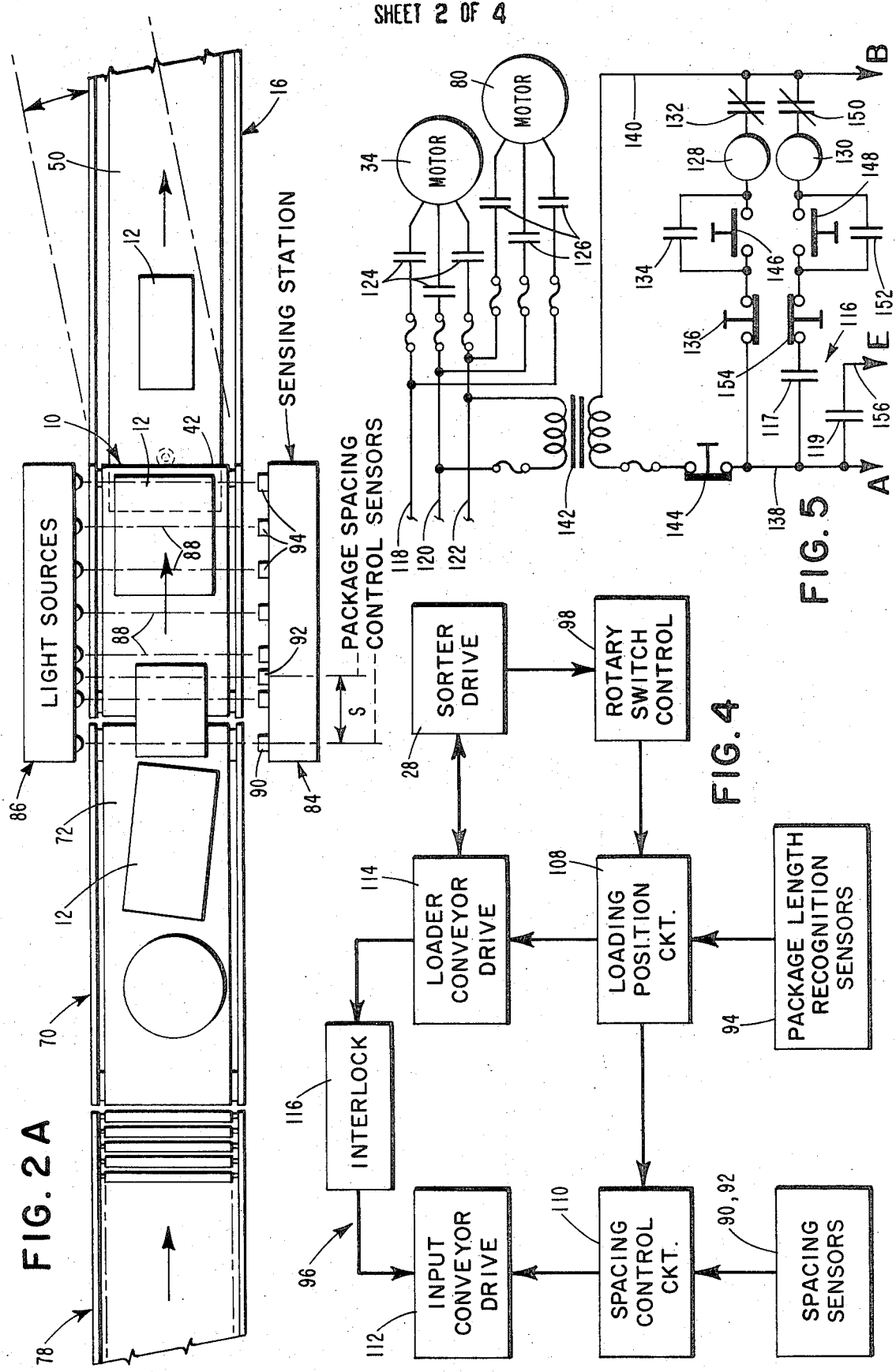

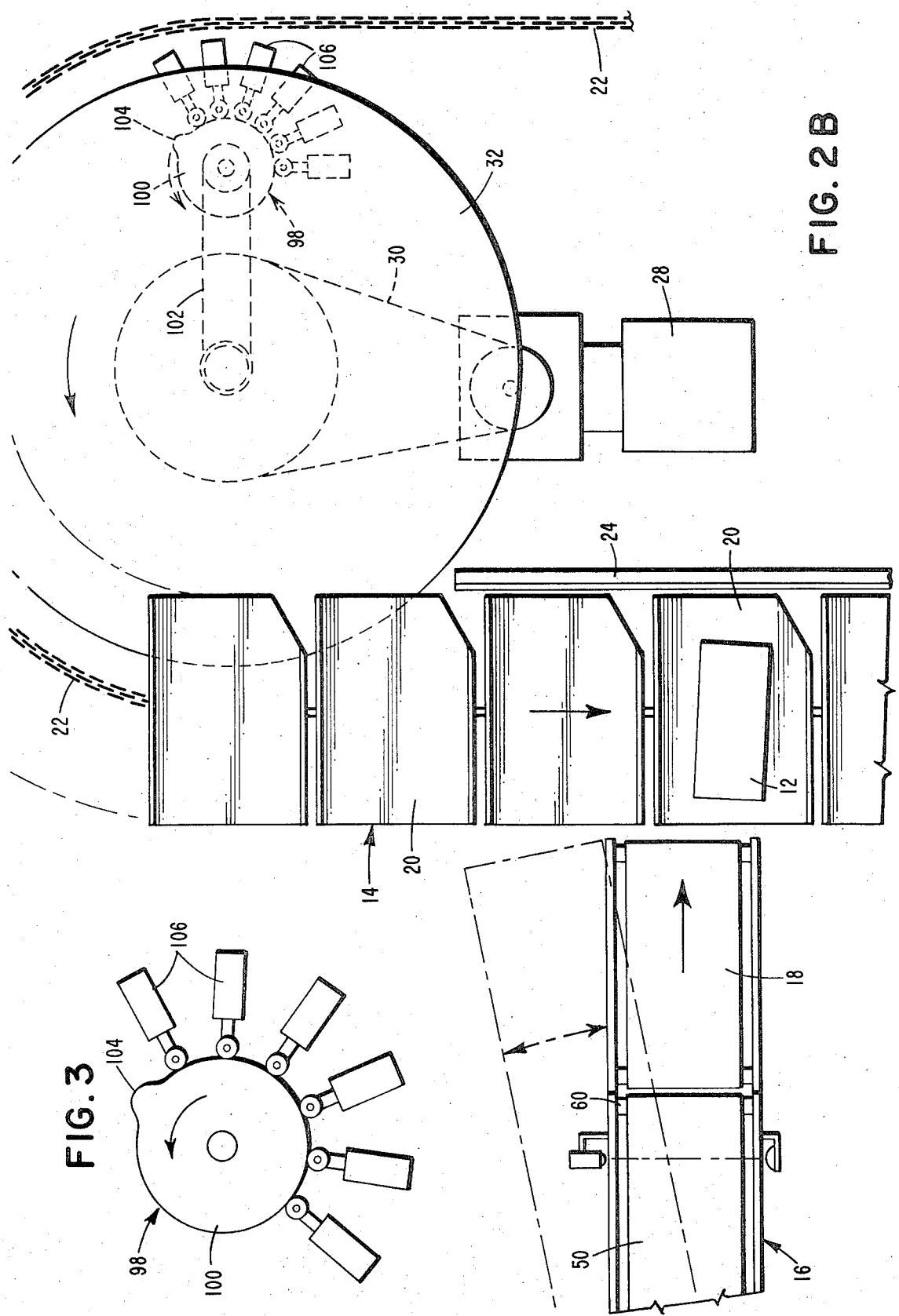

AUTOMATIC LOADING SYSTEM

This invention relates to the sorting and distribution of articles or packages by powered conveyor systems and more particularly to the transfer of packages from one conveyor to another in an induction conveyor system of the type disclosed in prior copending application, U.S. Ser. No. 69,409, filed Sept. 3, 1970, now abandoned in favor of continuation application Ser. No. 328,020, filed Jan. 30, 1973, and owned in common with the present application.

In induction conveyor systems of the aforementioned type, packages are delivered to selected destinations by trays carried on a sorter conveyor. The packages are coded in accordance with the desired destination and then transferred by a loader belt conveyor to the trays on the sorter conveyor. For such transfer of the packages, a predetermined speed relationship between the loader and the sorter conveyors must be maintained in order to synchronize departure of each package from the loader conveyor with alignment of a tray on the sorter conveyor at the delivery end of the loader conveyor. To increase the speed of the sorter conveyor, an oscillating transport conveyor is interposed between the delivery end of the loader conveyor and the sorter conveyor. To obtain synchronization, however, the packages must be properly located on the loader conveyor at the instant movement is imparted thereto toward the sorter conveyor. In the prior copending application, aforementioned, locations on the loader conveyor are appropriately marked so that packages may be precisely placed, manually, on the loader conveyor. This, of course, requires constant attention on the part of personnel.

It is therefore, an important object of the present invention to eliminate misalignment during transfer of articles to the trays of a sorter conveyor due to human error as well as to reduce fatigue on the part of personnel by eliminating manual positioning or targeting of packages at precise locations on the loader conveyor.

In accordance with the present invention, packages are automatically positioned on a loader conveyor of an induction conveyor system by intermittently stopping movement of the loader conveyor while the sorter conveyor continues to move at a constant speed having a fixed ratio to the speed of the loader conveyor during movement. The packages which are delivered at random to an input conveyor for coding by an operator, are transferred to the loader conveyor with a required minimum spacing therebetween dictated by spacing control sensors intermittently stopping movement of the input conveyor. The spacing control sensors are respectively positioned adjacent the delivery end of the input conveyor and the input end of the loader conveyor for this purpose. Additional length recognition sensors are positioned along the loader conveyor to detect the presence of packages therealong. Through a length recognition circuit, the additional sensors are operative to measure package length and regulate intermittent stopping of the loader conveyor by synchronizing signals so that the center of each discharged package will be in the center of a pre-assigned position on the sorter conveyor regardless of package length. The spacing between the length recognition sensors is less than the afore-mentioned minimum spacing limit established by the spacing control sensors to enable more than one package to be conveyed on the loader conveyor at one time. The latter function of the spacing control sensors is performed with packages that are either longer or shorter than the minimum spacing. Interlock means is provided to prevent starting of the input conveyor while the loader conveyor motor is stopped to preclude any malfunction.

In the Drawings:

FIGS. 1A and 1B are simplified side elevational views of an induction conveyor system with which the present invention is associated.

FIGS. 2A and 2B are top plan views of the conveyor system shown in FIGS. 1A and 1B.

FIG. 3 is a top plan view of a rotary synchronizer switch assembly utilized in the conveyor system as shown in FIG. 2B.

FIG. 4 is a schematic block diagram depicting the control system associated with the present invention.

FIGS. 5, 6 and 7 are electrical circuit diagrams illustrating the details of the control system in one embodiment of the invention.

Figure 6:
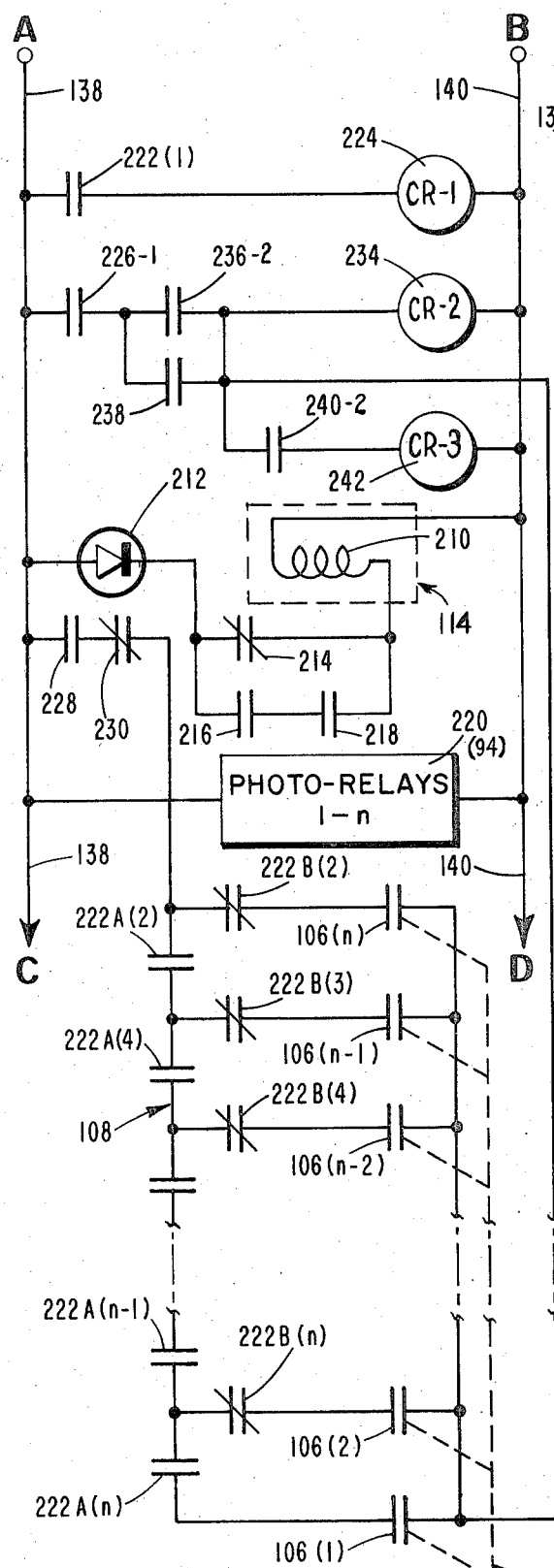

Referring now to the drawings in detail, FIGS. 1A, 1B, 2A and 2B illustrate a conveyor system similar to that disclosed aforementioned in prior copending application, U.S. Ser. No. 69,409, filed Sept. 3, 1970, in that a loader conveyor 10 onto which coded packages 12 are placed, is operative to convey the packages toward a sorting or delivery conveyor 14 for distribution of the packages at a plurality of remote destinations (not shown). The loader conveyor extends transverse to the path of travel of the sorter conveyor and in the illustrated embodiment delivers the packages to an oscillating transport conveyor 16 having a spitter belt section 18 from which the packages are transferred to receiving portion or trays 20 connected to the endless conveyor chain 22 of the sorter conveyor. A backstop 24 is secured to the conveyor frame 26 on the side of the trays opposite the spitter belt 18 to confine the packages to the trays along the arc of travel of the oscillating transport conveyor as shown in FIGS. 1A and 1B.

The sorter conveyor is continuously driven at a predetermined speed by a sorter drive mechanism 28 drivingly connected by a flexible chain drive 30 to the drive wheel 32 at one end of the sorter conveyor as seen in FIG. 2B. The loader conveyor is driven by a drive motor 34 mounted on the conveyor frame 36 as shown in FIG. 1A, through a chain drive 38 connected to the drive pulley 40 of the endless conveyor belt 42 having an upper horizontal run extending from an input end pulley 44 to a delivery end pulley 46. The delivery end pulley 44 to a delivery end pulley 46. The delivery end of the conveyor belt 42 overlies the input end pulley 48 about which the endless conveyor belt 50 is entrained in the transport conveyor. The belt 50 is mounted on an oscillating frame 52 pivotally mounted by the bearing assembly 54 on the stationary frame 56 establishing a vertical pivotal axis at the delivery end of the loader conveyor. A motor drive 58 carried by the frame 52, drives the belt 50, the upper run of which extends at an upward incline to the pulley 60 as more clearly seen in FIG. 1B. The pulley 60 is drivingly connected to the horizontal spitter belt 18. An oscillating drive mechanism 62 carried by a stationary frame 64, is drivingly connected to the end portion 66 of the oscillating frame 52 on which the spitter belt 18 is mounted, in order to impart oscillatory movement to the frame 52 about the axis established by bearing assembly 54. Guide means 68 are mounted on the frame 64 to guide movement of the frame in its arc of travel adjacent to the open ends of the trays 20 of the sorter conveyor.

In accordance with the present invention, the stationary frame 36 mounts an input conveyor 70 having an endless conveyor belt 72 with an upper horizontal run at a level slightly lower than the upper run of conveyor belt 42. The upper run of belt 72 extends from end pulley 74 to delivery end pulley 75 located adjacent to the input end of loader conveyor 10, as more clearly seen in FIG. 1A, in order to transfer packages thereto. The packages are deposited onto the input conveyor by a downwardly inclined gravity roller conveyor 78. A drive motor 80 is drivingly connected through a reduction drive mechanism 82 to the conveyor belt 72 for imparting movement thereto at a speed less than that of the loader conveyor belt 42 thereby insuring an initial separation between packages to permit sensor 90 to operate. The loader conveyor, on the other hand, is driven by drive motor 34 at a fixed speed ratio to movement of the sorter conveyor in order to maintain synchronization. The speed of conveyor belt 50 in the transport conveyor is the same as that of the loader conveyor and its oscillatory movement permits the sorter conveyor to be driven at a higher speed than that which would be required if packages were directly transferred from the loader conveyor to the trays of the sorter conveyor.

As will be explained hereafter, in detail, movement of the loader conveyor is intermittently stopped under control of an article length and presence recognition means including a photo-relay assembly 84 positioned on one longitudinal side of the loader conveyor as more clearly seen in FIG. 2A and a lamp assembly 86 on the other side. A plurality of light beams 88 emerge from assembly 86 in alignment with associated photo-sensors to detect the presence of packages interrupting the light beams. Two photo-sensors 90 and 92 are respectively positioned adjacent the delivery end of the input conveyor 70 and the input end of the loader conveyor 10 in order to control the minimum spacing between packages on the loader conveyor. Thus, the spacing(s) between the photo-sensors 90 and 92 determines the minimum spacing between packages. The assembly 84 also includes a plurality of length recognition photo-sensors 94 spaced from each other along the loader conveyor by a distance less than (S), to handle more than one package at a time on the conveyor while regulating intermittent interruption in movement of the loader conveyor in accordance with the length of the leading package thereon. The loader conveyor accordingly has a length exceeding the length of the longest package to be handled. As a result of the foregoing arrangement, the delivery end of the oscillating transport conveyor at the mid position of its stroke will be aligned with the center of a tray 20 at the instant the center of a package arrives at the delivery end for transfer of the package to the sorter conveyor. Such synchronization is achieved through a control system 96 diagrammatically shown in FIG. 4, in conjunction with intermittent tray positioning signals received from a rotary synchronizing switch assembly 98 driven by the sorter conveyor as shown in FIGS. 2B and 3. The rotary switch assembly, in the illustrated embodiment includes a cam 100 drivingly connected by a chain drive 102 to the pulley wheel 32 of the sorter conveyor. The cam has a switch actuating lobe 104 for sequentially actuating a plurality of fixedly mounted switches 106 from which synchronizing signals are obtained in timed relation to movement of the sorter conveyor. In the illustrated embodiment six switches 106 are shown, corresponding to six length recognition sensors 94. The actual number of switches 106 and sensors 94, may of course vary.

In FIG. 4, positioning signals from the rotary switch assembly 98 are shown applied to a loading position circuit 108 to which the length recognition sensors 94 are connected. The spacing sensors 90 and 92, on the other hand, are connected to a spacing control circuit 110 from which spacing signals are derived and fed to the input conveyor drive control 112 in order to intermittantly stop the input conveyor and thereby maintain minimum spacing between the packages transferred to the loader conveyor. The spacing control circuit is also controlled by the loading position circuit 108 which receives inputs from the rotary switch control 98 and the sensors 94 to supply synchronizing signals to the loader conveyor drive control 114 causing the loader conveyor to intermittantly stop. An interlock 116 prevents movement of the input conveyor while the loader conveyor is stationary.

FIG. 5 shows a basically conventional motor control circuit for the input and loader conveyor drive motors 34 and 80, that run continuously during operation. In accordance with the present invention, the drive controls 112 and 114 and the interlock 116 in the form of normally opened relay switches 117 and 119 insures that the drive motor 34 for the loader conveyor starts before motor 80 to prevent pile up of packages from the input conveyor. Thus, each of the drive motors in connected to three phase ac power lines 118, 120 and 122 through three normally opened starter relay switches 124 and 126 respectively. The switches 124 and 126 are respectively closed by energization of relay coils 128 and 130. The loader conveyor starter coil 128 is connected in series with an overload switch 132, normally opened relay holding switch 134 and a normally closed, manual stop switch 136 across power lines 138 and 140 connected to the secondary winding of power transformer 142 through a normally closed stop switch 144. The primary winding of the transformer is connected across two of the power phase lines 120 and 122. The drive motor 34 is thereby started by momentary closing of the start switch 146 connected in parallel with the relay holding switch 134. Similarly, closing of the start switch 148 energizes the starter coil 130 for the input conveyor motor 80, coil 130 also being connected in series with its overload switch 150, its relay holding switch 152 and a manual override stop switch 154 that may be manually opened to stop the input conveyor and enable the coding of packages. The relay circuit for coil 130 is furthermore connected in series with the normally opened, interlock switch 117, which is closed upon energization of starter coil 128 for the loader conveyor drive motor. Also, interlock switch 119 is closed upon energization of coil 128 to supply power to the spacing control circuit 110 through ac voltage lines 156 and 140.

Figure 7:
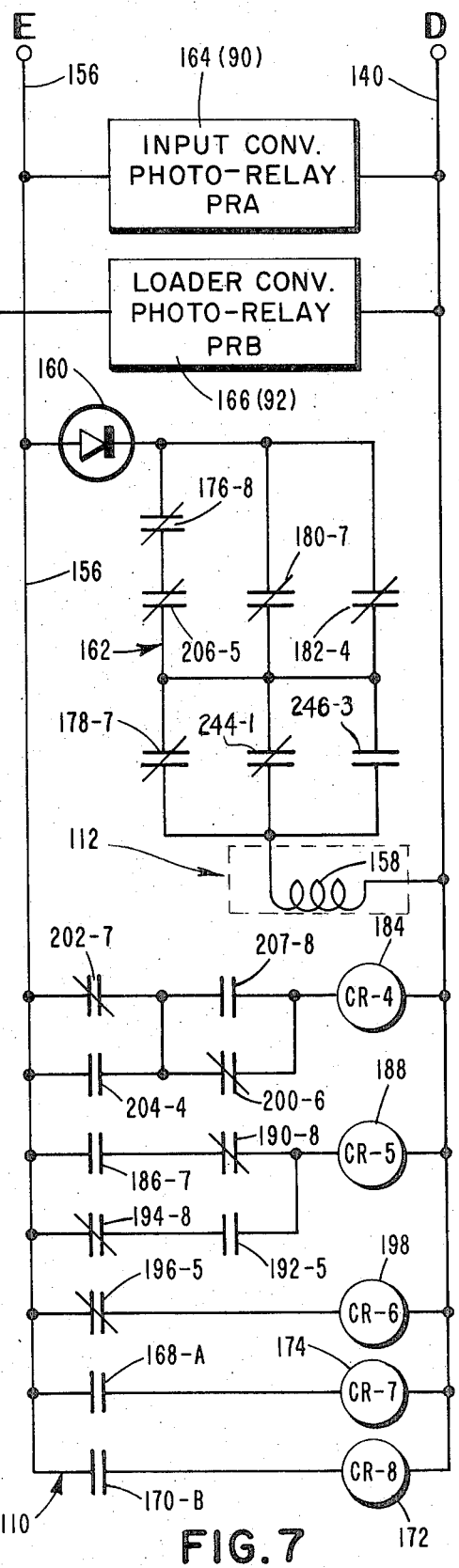

The conveyor drive controls 112 and 114 include conventional clutch-brake devices of the type which the drive motor is coupled by a normally disengaged clutch to the conveyor drive mechanism, the clutch being engaged simultaneously with disengagement of a brake to operate the conveyor upon energization of a DC control solenoid such as the solenoid 158 in the input conveyor drive control 112 shown in FIG. 7. The brake release solenoid 158 is connected in series with a rectifier 160 across the power lines 156 and 150 for the spacing control circuit by a relay switch circuit 162. A photo-relay device 164 associated with the spacing sensor 90 is also connected across the power lines 156 and 140 to actuate a plurality of relay switches when the loader conveyor motor 34 is started and a package is detected at the delivery end of the input conveyor. The other spacing sensor 92 is associated with a photo-relay device 166 which is connected across power lines 138 and 140 and is energized when spacing sensor 92 detects a package on the loader conveyor. The photo-relay devices 164 and 166 when energized, respectively close relay switches 168 and 170 to energize relay coils 174 and 172 in the spacing control circuit. Through normally closed relay switches 176 and 178, relay coil 172 when energized opens one parallel branch in circuit 162 interconnecting the rectifier 160 with the brake release solenoid 158. Relay coil 174 when energized opens normally closed relay switch 180 in another parallel branch. Thus, simultaneous detection of packages by both sensors 90 and 92 is operative to open the circuit connections to the solenoid 158 and thereby stop the input conveyor. The distance between the sensor 90 and 92 therefore determines the minimum spacing maintained on the loader conveyor by intermittant stopping of the input conveyor.

The foregoing spacing control functions of sensors 90 and 92 are, however, modified to avoid unintentional stopping of the input conveyor when both sensors are detecting the same package which is longer than the distance between sensors. Toward that end, a normally closed relay switch 182 forms a third parallel branch in circuit 162 to maintain the solenoid 158 energized when both of the other two circuit branches are opened by sensors 90 and 92 detecting the same package. Switch 182 is opened, however, by energization of relay coil 184 to permit stoppage of the input conveyor when the circuit 110 recognizes a package that is smaller than the minimum spacing The spacing control circuit 110 recognizes large and small packages by the package detection sequence dictating operation of the control relays therein. Initially, relay coil 198 is maintained energized through normally closed relay switch 196 to hold relay switch 200 open. When a package is then detected by sensor 90 on the input conveyor, switch 196 is opened by relay coil 188 energized upon closing of switch 186 in response to operation of relay coil 174 by sensor 90. Deenergization of relay coil 198 opens switch 200 and circuit 110 is then in condition or set to subsequently recognize a small or large package. Also, by opening of switches 178 and 180 in circuit 162 in response to detection of a package by sensor 90, the circuit 110 is able to control timely stopping of the input conveyor by deenergizing the clutch/brake coil 158.

If the package initially detected on the input conveyor by sensor 90 is long, the same package will subsequently be detected by sensor 92 while it is still detected by sensor 90. On the other hand, if the package is small it will pass sensor 90 before being detected by sensor 92. Also, whether the package is small or large, the input conveyor will be stopped whenever the sensors 90 and 92 simultaneously detect different packages. When both sensors are detecting different packages, relay coils 172 and 174 are both energized to open switches 176 and 180 in two of the branches of circuit 162 while relay coil 184 is energized in circuit 110 to open the third branch through switch 182 thereby stopping the input conveyor. Relay coil 184 is maintained energized through its relay holding switch 204 in series with switch 207 so that subsequent opening of switch 207 when the package on the running loader conveyor passes sensor 92, will deenergize relay coil 184 and close switch 182 to resume running operation of the input conveyor.

Relay coil 184 is initially energized through switch 202 in series with either switch 207 or switch 200. It may therefore be initially energized when neither sensor is detecting after the package passes the sensor 90 to cause switch 202 to close in response to deenergization of relay coil 174, switch 200 already being closed by previous setting of circuit 110 as aforementioned. This reflects a small package and results in stopping of the input conveyor when another package is detected by sensor 90 to again energize relay coil 188 as aforementioned opening switch 206 in circuit 162. Relay coil 184 remains energized through its holding switch 204 in series with switch 200 that is closed when circuit 110 is set. The input conveyor is accordingly stopped by opening of switches 206, 180 and 182 in circuit 162. The input conveyor remains stopped when the package on the loader conveyor reaches sensor 92 even though relay coil 188 is deenergized by opening of switches 190 and 194, because relay coil 184 remains energized through switches 204 and 207 while switch 176 keeps its branch open when switch 206 closes. Operation of the input conveyor resumes only when the package on the loader conveyor passes sensor 92 to again set circuit 110 with sensor 90 alone detecting.

Relay coil 184 may also be initially energized by sensor 92 alone detecting a package following simultaneous detection of the same long package by both sensors without stopping the input conveyor. After circuit 110 is set as aforementioned by initial detection of the package by sensor 90, detection by both sensors results in opening of switches 190 and 194 by relay coil 172 to deenergize relay coil 188 and reenergize relay coil 198 thereby closing switch 200. When the package passes sensor 90, switch 202 closes to energize relay coil 184 through relay switch 207 and the relay coil 184 is latched through its holding switch 204 in series with switch 200. Thus, the relay coil 184 remains energized upon opening of switch 202 when another package is detected by sensor 90 to effect stopping of the input conveyor. When the package on the loader conveyor passes sensor 92, circuit 110 is again set.

Referring now to FIG. 6, the loader conveyor drive control 114 is connected across power lines 138 and 140 to intermittantly start and stop operation of the loader conveyor by controlling energization of the brake release solenoid 210 connected in series with rectifier 212 through normally closed relay switch 214 in parallel with series connected relay switches 216 and 218 that are normally open. The power lines 138 and 140 are also connected to a plurality of photo-relay devices 220(1) through 220(n) corresponding to the length recognition sensors 94. The relay devices 220 are accordingly energized and deenergized in sequence as a package moves along the loader conveyor. When the last sensor 94 detects the package approaching the delivery end of the loader conveyor, it energizes a corresponding relay device 220(1) to close an associated, normally open relay switch 222(1) thereby energizing relay coil 224 connected in series with switch 222(1)

across power lines 138 and 140. Relay switches 226, 228 and 216 are thereby closed, while relay switch 214 is opened. Relay switch 228 then supplies power to activate the loading position circuit 108 through normally closed relay switch 230 while solenoid 210 is deenergized by switch 214 to stop the loader conveyor. At that instant, a certain number of the photo-relay devices 220(1) through 220(x) will be energized depending on the length of the package while the other photo-relay devices, 220(x+1) to 220(n) will be deenergized. Accordingly, the energized photo-relay devices actuate associated relay switches in the activated loading position circuit 108 to close normally open switches 222A(2) through 222A(x) and open normally closed switches 222B(2) through 222B(x). A current path is thereby established through relay switches 222A(2) through 222A(x) connected in series and switch 222B(x+1).

Each photo-relay switch 222B as shown in FIG. 6, is connected in series with one of the switches 106 in the rotary switch assembly 98. Thus, when the loading position circuit is activated upon detection of a package by the last sensor 94, as aforementioned, it awaits completion of a circuit through switch 222B(x+1) in series with an associated one of the sequentially activated switches 106 at the proper synchronized instant dependent on the length of the package. When the circuit is completed, current is conducted through line 232 to relay coil 234 for energization thereof. When energized, relay coil 234 closes its relay switch 218 to complete an energizing circuit for solenoid 210 through closed relay switch 216 and closes its relay holding switch 236. The loading conveyor then resumes operation. At the same time relay switches 238 and 240 are closed to energize relay coil 242. When energized, relay coil 242 opens relay switch 230 to deactivate the loading position circuit.

It will therefore be apparent that each package is measured by the loading position circuit through switches 222A and 222B to appropriately select the switch 106 of the rotary switch assembly 98 through which positioning signals are operative to determine the duration of the period during which the loader conveyor is stopped when a package reaches the delivery end, in order to synchronize transfer with movement of the sorter conveyor. When the package departs from the loader conveyor and the last sensor 94 no longer detects, switch 222(1) opens to deenergize relay coil 224 causing reset of the circuits by opening of switch 226 to deenergize relay coils 234 and 242. Switch 228 also opens to maintain the loading position circuit deactivated.

The presence of more than one package on the loader conveyor will not adversely affect operation of the loading position circuit 108 as hereinbefore described because the distance between packages is always greater than the spacing between the length recognition sensors 94. Thus, there will always be at least one sensor 94 between adjacent packages that is not detecting so as to preclude extension of the series circuit established by sensors 94 through switches 222A and 222B for the leading package.

When a measuring cycle is begun as hereinbefore described upon detection of a package by the last sensor 94, switch 204 in the spacing control circuit 110 is closed as aforementioned by energization of relay coil 224 to stop the input conveyor if the circuit 110 has been set. Relay coil 224 also opens switch 244 connected in parallel with switch 178 so as to stop the input conveyor if a package is detected by sensor 92 during the measuring cycle. At the end of the measuring cycle, when relay 242 is energized switch 246 is closed to cause the input conveyor to resume operation.

The foregoing description relates to an automatic loading system associated with a sorter conveyor. The system may, however, be applied to other installations where synchronization is required such as the merging discharge of two or more conveyors onto one conveyor. The loading system for general application, features the acceptance of packages of different lengths by random delivery onto an input conveyor from which they are transferred to a faster moving loading conveyor that is intermittantly stopped to obtain a fixed center to center relationship between packages as they are discharged from the delivery end of the loading conveyor. Toward this end the length of each package on the loading conveyor is recognized in increments by length recognition sensors that control switches connected in series with synchronizing switches actuated in timed sequence, to control the run-stop cycle of the loading conveyor. For maximum package handling efficiency, a minimum separation between adjacent packages transferred to the loading conveyor is predetermined by stopping of the input conveyor under control of spacing sensors positioned at the delivery end of the input conveyor and adjacent the input end of the loading conveyor. The minimum separation distance between the spacing control sensor exceeds the spacing between the length recognition sensors along the loading conveyor so that at least one length recognition sensor will always detect no package. In this way more than one package at a time may be conveyed along the loading conveyor although only the leading package will be measured to control the run-stop cycle. The package spacing control will furthermore perform its function even when the packages are shorter than the minimum package spacing limit imposed by the spacing control sensors.

We claim:

1. In combination with a continuously moving delivery conveyor having individual receiving portions, a loading conveyor from which articles are transferred to said portions of the delivery conveyor, drive means operatively connected to the loading conveyor for movement thereof at a fixed ratio to the delivery conveyor, synchronizing means driven by the delivery conveyor for generating intermittent portion positioning signals, and article length recognition means positioned along the loading conveyor and connected to the synchronizing means for interrupting said movement of the loading conveyor at the fixed speed ratio to locate an article on the loading conveyor in operative transfer relation to the delivery conveyor so that the center of said length of the article is transferred to the center of a receiving portion.

2. The combination of claim 1 including an input conveyor from which the articles are transferred to the loading conveyor, interlock means for preventing movement of the input conveyor while the loading conveyor is stationary, means for sensing articles on the input and loading conveyors and spacing control means connected to said sensing means for controlling movement of the input conveyor to maintain a minimum spacing between articles transferred to the loading conveyor.

3. The combination of claim 2 wherein the length recognition means includes article measuring means for detecting the presence of the articles at a plurality of locations along the loading conveyor and to loading position control means operatively connecting the synchronizing means and the article measuring means to the drive means for intermittantly interrupting movement of the loading conveyor.

4. The combination of claim 3 wherein said spacing control means includes means for interrupting movement of the input conveyor in response to spacing signals and means connected to the sensing means for generating said spacing signals in response to articles spaced less than said minimum spacing.

5. The combination of claim 4 wherein the spacing between the article measuring means at said locations along the loading conveyor is less than said minimum spacing.

6. The combination of claim 2 wherein said spacing control means includes means for interrupting movement of the input conveyor in response to spacing signals and means connected to the sensing means for generating said spacing signals in response to simultaneous detection of articles on the input and loading conveyors.

7. The combination of claim 3 wherein the spacing between the article measuring means at said locations along the loading conveyor is less than said minimum spacing.

8. The combination of claim 1 wherein the signal controlled means includes article measuring means for detecting the presence of the articles at a plurality of locations along the loading conveyor and length recognition means operatively connecting the synchronizing means and the article measuring means to the drive means for intermittantly interrupting movement of the loading conveyor.

* * * * *